R. M. ELLIS.
CHURN.
APPLICATION FILED JULY 12, 1921.
1,408,994.
Patented Mar. 7, 1922.
2 SHEETS—SHEET 1.
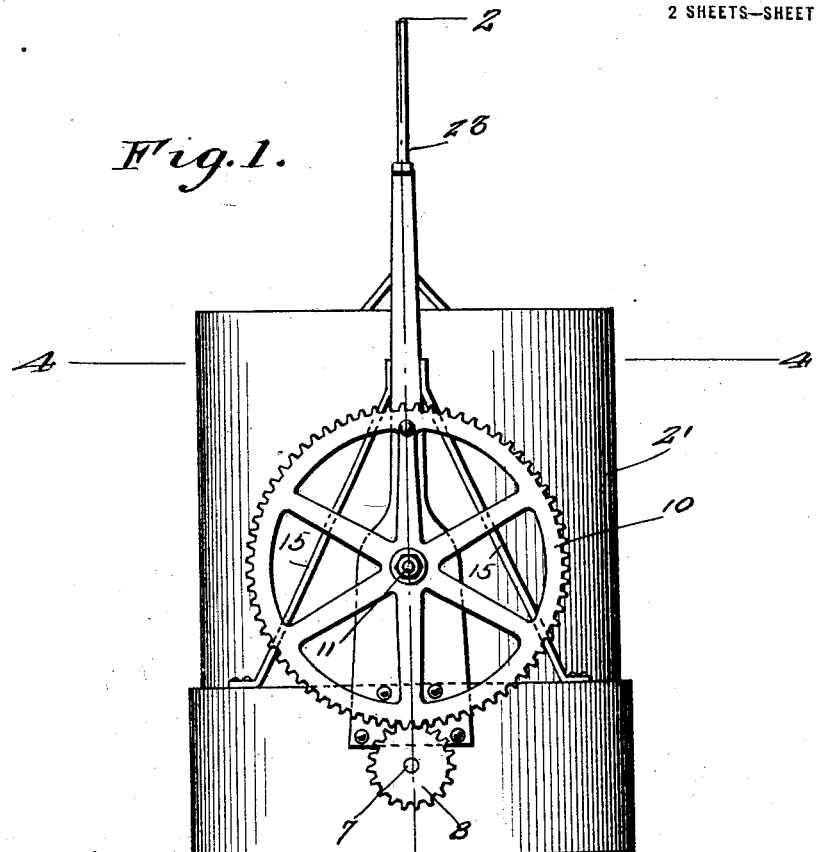
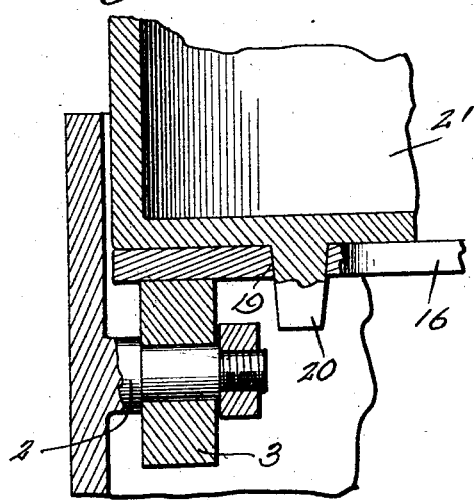
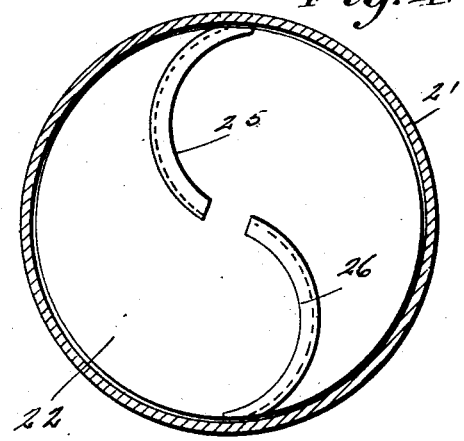
R. M. Ellis INVENTOR
BY Victor J. Evans ATTORNEY
WITNESSES
R. A. Thomas

R. M. ELLIS.
CHURN.
APPLICATION FILED JULY 12, 1921.

1,408,994.

Patented Mar. 7, 1922.
2 SHEETS—SHEET 2.

R. M. Ellis, INVENTOR
BY Victor J. Evans
ATTORNEY

WITNESSES

UNITED STATES PATENT OFFICE.

ROBERT M. ELLIS, OF PORT ALBERNI, BRITISH COLUMBIA, CANADA.

CHURN.

1,408,994.

Specification of Letters Patent.  Patented Mar. 7, 1922.

Application filed July 12, 1921.  Serial No. 484,245.

*To all whom it may concern:*

Be it known that I, ROBERT M. ELLIS, a citizen of Canada, a British subject, residing at Port Alberni, in the Province of British Columbia and Dominion of Canada, have invented new and useful Improvements in Churns, of which the following is a specification.

My present invention has reference to a butter churning apparatus.

My object is to produce a churn of a simple, cheaply constructed, strong and efficient nature in which the cream to be churned is subjected to a centrifugal action so that the upper surface of the cream will assume the shape of an inverted cone, that is the cream will be high at the outside and low in the center, and the cream at the outside is caused to strike against flanges carried by the top member of the churn, the globules broken and directed to the center of the cream, thus mixing and churning the cream in an easy and expeditious manner.

The foregoing, and other objects which will appear as the nature of the invention is better understood, may be accomplished by a construction, combination and operative arrangement of parts, such as is disclosed by the drawings which accompany and which form part of this application.

In the drawings:—

Figure 1 is a rear elevation of a churn constructed in accordance with this invention.

Figure 3 is a sectional view approximately on the line 3—3 of Figure 1.

Figure 4 is a sectional view approximately on the line 4—4 of Figure 1, looking in the direction of the arrows.

Figure 2:
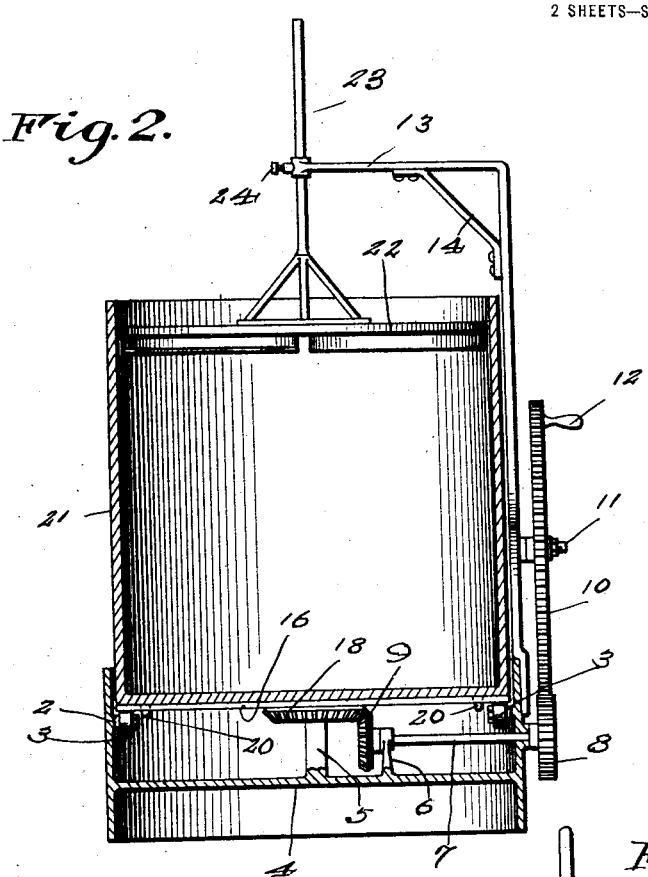
Figure 2 is a sectional view approximately on the line 2—2 of Figure 1.
Figure 5:
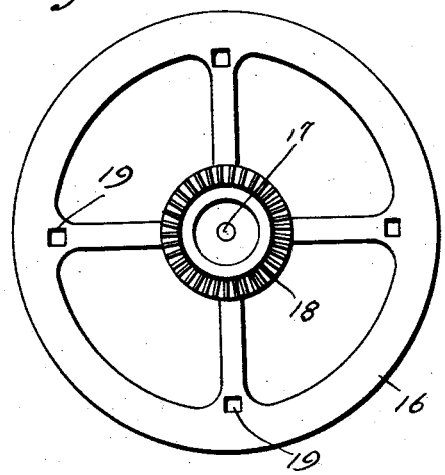
Figure 5 is a detail view of the revoluble member supported on the frame and to which the churn tub is removably connected.
Figure 6:
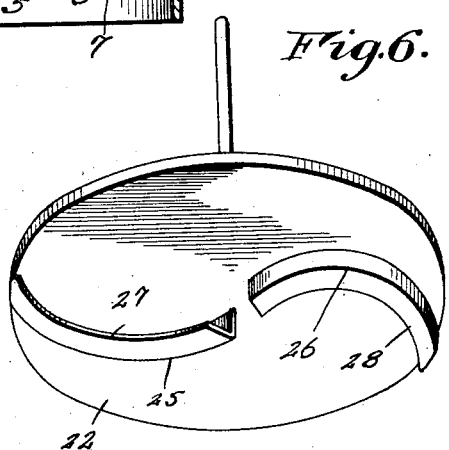
Figure 6 is a perspective view looking toward the inner face of the adjustable top for the churn.

As disclosed by the drawings, I make use of a suitable frame member which is broadly indicated by the numeral 1. The frame may have its base of a hollow cylindrical formation, the same, at equi-distantly spaced points being provided with the inwardly directed stub shafts 2 on which rollers 3 are journaled. The rollers 3 are arranged a suitable distance above the bottom 4 of the base, the said bottom being centrally provided with an upstanding stub shaft 5 and a bracket 6 to one side of the stub shaft. The bracket is provided with a bearing for a horizontally arranged shaft 7 and also finds a bearing in an opening in the rear of the frame 1. The outer end of the shaft 7 has keyed thereon a pinion 8, while the inner end of the said shaft has secured thereto a gear 9. The pinion 8 is in mesh with a comparatively large toothed wheel 10 journaled on a shaft 11 that extends outwardly from the rear face of the frame, and in the showing of the drawings, the wheel 10 is provided with an operating handle 12. It is, of course, to be understood that when the device is operated by power, a belt wheel or gear will be provided upon the outer face of the wheel 10.

The rear portion of the frame projects a considerable distance above the base or bottom thereof, the said rear portion has its upper end provided with an angle arm 15 that projects over and terminates beyond the center of the base. Between the arm and the back proper there are angle braces 14 and between the back and base there are similar angle brace members 15.

Resting on the rollers 3 there is a circular plate 16. This plate is centrally formed with an opening 17 that provides a bearing for the stub shaft 5, and on the under face of the plate, at the center thereof is a gear 18 that meshes with the gear 9. The plate 16, at equi-distantly spaced points near its periphery has openings 19 therethrough, and through these openings are designed to pass fingers 20 provided upon the bottom of the churn tub 21. The churn tub is cylindrical, and, of course, has its top open. In the open top of the tub 21 is the round flat cover member 22. The cover 22 has secured thereto and suitably braced thereon a centrally disposed outstanding rod 23. The arm 13 of the frame 1 has its outer end provided with a boss, and the rod 23 passes through an opening in said boss. The boss has a laterally threaded opening which receives a binding screw 24 which contacts with the rod 23 to hold the top or cover member 22 adjusted with respect to the churn tub or body 21.

On the inner face of the top or cover 22 there are oppositely directed rounded flanges 25 and 26 which extend from points adjacent to the said top or cover to the periphery thereof. The flanges 25 and 26 have their edges provided with angle portions 27 and 28 respectively, and these angle portions are oppositely directed, as disclosed by the drawings.

The turning of the wheel 10 will, through the medium of the intermeshing elements, cause the plate 16 to be revolved, and the turning of the plate 16 will likewise revolve the churn tub or body 21. The cream to be churned is placed in the tub or body. The top or cover 22 is vertically adjusted so that the same is disposed a slight distance above the level of the cream. The turning of the tub subjects the cream to a centrifugal action which causes the same, at the top thereof to assume the shape of an inverted cone, that is the cream will be lowest at its center and highest at its edges. The elevated portion of the cream will be brought into contact with the breaker members 25 and 26, which will direct the said cream toward the center of the body thereof, breaking the globules and directing the same again to the center of the cream. In this manner, the cream will be churned in an expeditious and in an easy manner.

Having thus described the invention, what I claim, is:—

1. A device of the class described comprising a frame having a circular base, stub shafts extending inwardly from said base at diametrically opposite points thereof, rollers mounted on said shafts, a circular plate engaging said rollers and provided with a plurality of openings at equi-distantly spaced points near its periphery, a cylindrical tub engaging said plate, fingers extending from the bottom of said tub and engaging the openings in said plate, and means carried by said frame for revolving said circular plate.

2. A device of the class described comprising a frame, a tub mounted upon said frame, a circular cover for said tub, a pair of oppositely directed curved substantially L-shaped flanges projecting downwardly from the lower side of said cover and extending inwardly from diametrically opposite points of its periphery to points adjacent to the center thereof, a rod extending upwardly from the opposite side of said cover, an angle arm carried by said frame, and binding means carried by said arm whereby the cover may be adjusted vertically with respect to said tub.

In testimony whereof I affix my signature.

ROBERT M. ELLIS.